(12) United States Patent
Fukao et al.

(10) Patent No.: US 9,487,268 B2
(45) Date of Patent: Nov. 8, 2016

(54) BICYCLE TRANSMISSION APPARATUS

(71) Applicant: SHIMANO INC., Sakai (JP)

(72) Inventors: Kazutaka Fukao, Sakai (JP); Souta Yamaguchi, Sakai (JP); Yoshimitsu Miki, Sakai (JP); Hideki Ikemoto, Sakai (JP); Masahiko Fukuda, Sakai (JP)

(73) Assignee: SHIMANO INC., Sakai (JP)

( * ) Notice: Subject to any disclaimer, the term of this patent is extended or adjusted under 35 U.S.C. 154(b) by 1 day.

(21) Appl. No.: 14/566,588

(22) Filed: Dec. 10, 2014

(65) Prior Publication Data

US 2016/0167738 A1 Jun. 16, 2016

(51) Int. Cl.
| | | |
|---|---|---|
| *B62M 9/10* | (2006.01) | |
| *F16H 59/14* | (2006.01) | |
| *B62M 9/122* | (2010.01) | |
| *F16H 59/70* | (2006.01) | |
| *F16H 59/38* | (2006.01) | |
| *B62M 25/08* | (2006.01) | |
| *F16H 61/684* | (2006.01) | |
| *F16H 59/02* | (2006.01) | |

(52) U.S. Cl.
CPC ............ *B62M 9/122* (2013.01); *B62M 9/105* (2013.01); *B62M 25/08* (2013.01); *F16H 59/14* (2013.01); *F16H 59/38* (2013.01); *F16H 59/70* (2013.01); *F16H 61/684* (2013.01); *F16H 2059/0221* (2013.01); *F16H 2059/147* (2013.01)

(58) Field of Classification Search
None
See application file for complete search history.

(56) References Cited

U.S. PATENT DOCUMENTS

| | | | | |
|---|---|---|---|---|
| 5,261,858 | A * | 11/1993 | Browning | B62M 9/122 474/69 |
| 6,227,068 | B1 * | 5/2001 | Masui | B62K 23/02 200/61.85 |
| 6,367,833 | B1 * | 4/2002 | Horiuchi | B62M 9/122 280/260 |
| 8,712,656 | B2 | 4/2014 | Lee | |
| 2003/0100392 | A1 * | 5/2003 | Ichida | B62M 25/045 474/69 |
| 2003/0216201 | A1 * | 11/2003 | Takeda | B62M 9/10 474/70 |
| 2009/0164076 | A1 * | 6/2009 | Vasiliotis | B62M 11/16 701/55 |
| 2014/0235383 | A1 * | 8/2014 | Wesling | F16H 9/06 474/80 |
| 2014/0290411 | A1 | 10/2014 | Kuroda | |
| 2014/0290412 | A1 | 10/2014 | Emura et al. | |

* cited by examiner

*Primary Examiner* — Justin Holmes
(74) *Attorney, Agent, or Firm* — Mori & Ward, LLP

(57) ABSTRACT

A bicycle transmission apparatus comprises a controller configured to control at least one transmission device in accordance with a transmission route in response to a shift signal. The controller is configured to adjust the transmission route based on bicycle information relating to a running condition of a bicycle.

25 Claims, 7 Drawing Sheets

| R1 | | FD G/P | | | | | |
|---|---|---|---|---|---|---|---|
| | | LOW | | MID | | TOP | |
| RD G/P | SHIFT SIGNAL | ACTION | | | | | |
| | | FD | RD | FD | RD | FD | RD |
| 1st | UP | - | UP | | | | |
| | DOWN | - | - | | | | |
| 2nd | UP | - | UP | | | | |
| | DOWN | - | DOWN | | | | |
| 3rd | UP | - | UP | | | | |
| | DOWN | - | DOWN | | | | |
| 4th | UP | - | UP | - | UP | | |
| | DOWN | - | DOWN | DOWN | UP | | |
| 5th | UP | UP | DOWN | - | UP | | |
| | DOWN | - | DOWN | - | DOWN | | |
| 6th | UP | | | - | UP | - | UP |
| | DOWN | | | - | DOWN | DOWN | UP |
| 7th | UP | | | UP | DOWN | - | UP |
| | DOWN | | | - | DOWN | - | DOWN |
| 8th | UP | | | | | - | UP |
| | DOWN | | | | | - | DOWN |
| 9th | UP | | | | | - | UP |
| | DOWN | | | | | - | DOWN |
| 10th | UP | | | | | - | - |
| | DOWN | | | | | - | DOWN |

*FIG. 3*

| RD G/P | R2 SHIFT SIGNAL | FD G/P |||||| 
|---|---|---|---|---|---|---|---|
| | | LOW || MID || TOP ||
| | | ACTION ||||||
| | | FD | RD | FD | RD | FD | RD |
| 1st | UP | - | UP | - | UP | | |
| | DOWN | - | - | DOWN | UP | | |
| 2nd | UP | UP | DOWN | - | UP | | |
| | DOWN | - | DOWN | - | DOWN | | |
| 3rd | UP | | | - | UP | | |
| | DOWN | | | - | DOWN | | |
| 4th | UP | | | - | UP | - | UP |
| | DOWN | | | - | DOWN | DOWN | UP |
| 5th | UP | | | UP | DOWN | - | UP |
| | DOWN | | | - | DOWN | - | DOWN |
| 6th | UP | | | | | - | UP |
| | DOWN | | | | | - | DOWN |
| 7th | UP | | | | | - | UP |
| | DOWN | | | | | - | DOWN |
| 8th | UP | | | | | - | UP |
| | DOWN | | | | | - | DOWN |
| 9th | UP | | | | | - | UP |
| | DOWN | | | | | - | DOWN |
| 10th | UP | | | | | - | - |
| | DOWN | | | | | - | DOWN |

*FIG. 4*

BICYCLE TRANSMISSION APPARATUS

BACKGROUND OF THE INVENTION

Field of the Invention

The present invention relates to a bicycle transmission apparatus.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle transmission apparatus configured to be electrically operated. Such bicycle transmissions are configured to change a gear position in response to gear shift commands from operating devices.

SUMMARY OF THE INVENTION

In accordance with a first aspect of the present invention, a bicycle transmission apparatus comprises a controller configured to control at least one transmission device in accordance with a transmission route in response to a shift signal. The controller is configured to adjust the transmission route based on bicycle information relating to a running condition of a bicycle.

In accordance with a second aspect of the present invention, the bicycle transmission apparatus according to the first aspect further comprises a bicycle-information obtaining device configured to obtain the bicycle information.

In accordance with a third aspect of the present invention, the bicycle transmission apparatus according to the first aspect is configured so that the bicycle information includes a cadence indicating a rotational speed of a crank of the bicycle. The controller is configured to adjust the transmission route based on the cadence.

In accordance with a fourth aspect of the present invention, the bicycle transmission apparatus according to the first aspect is configured so that the bicycle information includes a torque applied from a rider to a crank of the bicycle. The controller is configured to adjust the transmission route based on the torque.

In accordance with a fifth aspect of the present invention, the bicycle transmission apparatus according to the first aspect is configured so that the bicycle information includes an amount of energy applied from a rider to a crank of the bicycle. The controller is configured to adjust the transmission route based on the amount of energy.

In accordance with a sixth aspect of the present invention, the bicycle transmission apparatus according to the first aspect is configured so that the bicycle information includes a geographical location of the bicycle. The controller is configured to adjust the transmission route based on the geographical location.

In accordance with a seventh aspect of the present invention, the bicycle transmission apparatus according to the first aspect is configured so that the at least one transmission device includes a first transmission device and a second transmission device.

In accordance with an eighth aspect of the present invention, the bicycle transmission apparatus according to the seventh aspect is configured so that the first transmission device comprises a front derailleur. The second transmission device comprises a rear derailleur.

In accordance with a ninth aspect of the present invention, the bicycle transmission apparatus according to the seventh aspect is configured so that the transmission route includes a combination of a gear position of the first transmission device, a gear position of the second transmission device, and a transmission action to be performed at the gear position of the first transmission device and the gear position of the second transmission device in at least one of the first transmission device and the second transmission device in response to the shift signal.

In accordance with a tenth aspect of the present invention, the bicycle transmission apparatus according to the ninth aspect is configured so that the transmission action includes a first transmission action and a second transmission action. The first transmission action is to be performed at the gear position of the first transmission device and the gear position of the second transmission device in the first transmission device in response to the shift signal. The second transmission action is to be performed at the gear position of the first transmission device and the gear position of the second transmission device in the second transmission device in response to the shift signal.

In accordance with an eleventh aspect of the present invention, the bicycle transmission apparatus according to the first aspect further comprises an operating device configured to generate the shift signal. The operating device includes a first upshift switch and a first downshift switch. The first upshift switch is configured to generate a first upshift signal as the shift signal in response to an upshift input operation from a user. The first downshift switch is configured to generate a first downshift signal as the shift signal in response to a downshift input operation from the user.

In accordance with a twelfth aspect of the present invention, the bicycle transmission apparatus according to the eleventh aspect is configured so that the controller is configured to control the at least one transmission device in accordance with the transmission route in response to the first upshift signal. The controller is configured to control the at least one transmission device in accordance with the transmission route in response to the first downshift signal.

In accordance with a thirteenth aspect of the present invention, the bicycle transmission apparatus according to the first aspect is configured so that the controller has a first shifting mode and a second shifting mode. In the first shifting mode, the controller is configured to control the at least one transmission device in accordance with the transmission route in response to the shift signal with adjusting the transmission route. In the second shifting mode, the controller is configured to control the at least one transmission device in accordance with the transmission route in response to the shift signal without adjusting the transmission route.

In accordance with a fourteenth aspect of the present invention, the bicycle transmission apparatus according to the thirteenth aspect further comprises a mode selector configured to allow a user to select a shifting mode among the first shifting mode and the second shifting mode. The controller is configured to set the shifting mode selected via the mode selector.

In accordance with a fifteenth aspect of the present invention, the bicycle transmission apparatus according to the fourteenth aspect further comprises an operating device configured to generate the shift signal. The operating device includes a first upshift switch and a first downshift switch. The first upshift switch is configured to generate a first upshift signal as the shift signal in response to an upshift input operation from a user. The first downshift switch is configured to generate a first downshift signal as the shift signal in response to a downshift input operation from the user.

In accordance with a sixteenth aspect of the present invention, the bicycle transmission apparatus according to the fifteenth aspect is configured so that the controller has a third shifting mode in addition to the first shifting mode and the second shifting mode. In the third shifting mode, the controller is configured to control the first transmission device based on the first upshift signal and the first downshift signal without using the transmission route.

In accordance with a seventeenth aspect of the present invention, the bicycle transmission apparatus according to the sixteenth aspect is configured so that the operating device includes a second upshift switch and a second downshift switch. The second upshift switch is configured to generate a second upshift signal as the shift signal in response to an upshift input operation from the user. The second downshift switch is configured to generate a second downshift signal as the shift signal in response to a downshift input operation from the user.

In accordance with an eighteenth aspect of the present invention, the bicycle transmission apparatus according to the seventeenth aspect is configured so that the at least one transmission device includes a first transmission device and a second transmission device. In the third shifting mode, the controller is configured to control the first transmission device based on the first upshift signal and the first downshift signal without using the transmission route and to control the second transmission device based on the second upshift signal and the second downshift signal without using the transmission route.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows transmission actions to be performed in the bicycle transmission apparatus illustrated in FIG. 1 (first route);

FIG. 4 shows transmission actions to be performed in the bicycle transmission apparatus illustrated in FIG. 1 (second route);

DESCRIPTION OF THE EMBODIMENTS

Figure 1:
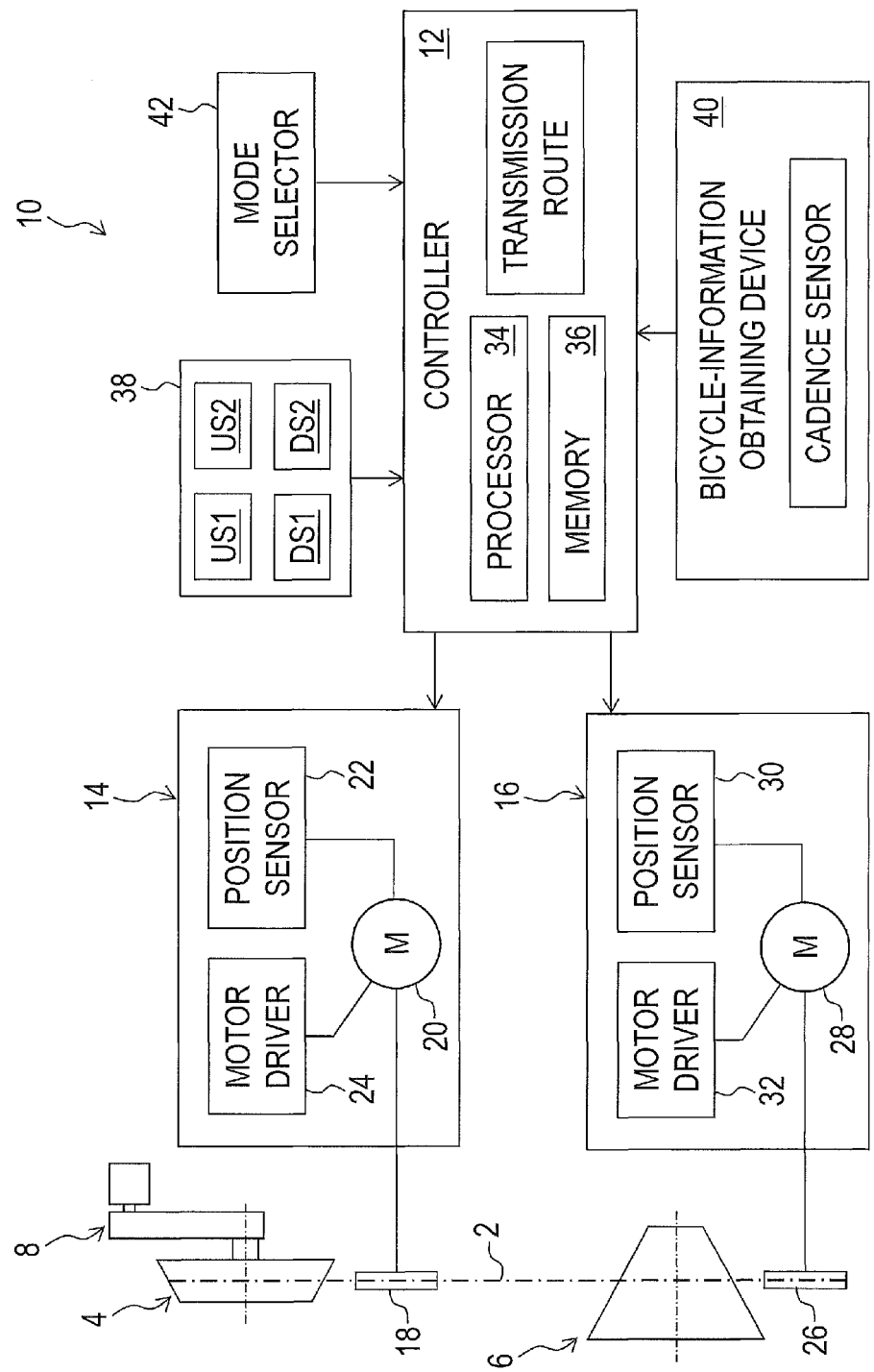
FIG. 1 is a block diagram of a bicycle transmission apparatus in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle transmission apparatus 10 comprises a controller 12 configured to control at least one transmission device. The at least one transmission device includes a first transmission device 14 and a second transmission device 16. In the illustrated embodiment, the first transmission device 14 comprises a front derailleur. The second transmission device 16 comprises a rear derailleur. However, the first transmission device 14 can comprise the rear derailleur, and the second transmission device 16 can comprise the front derailleur. At least one of the first transmission device 14 and the second transmission device 16 can comprise other type of transmission devices.

The first transmission device 14 is configured to shift a bicycle chain 2 relative to a front sprocket assembly 4. The second transmission device 16 is configured to shift the bicycle chain 2 relative to a rear sprocket assembly 6. In the illustrated embodiment, the front sprocket assembly 4 has a plurality of gear positions, and the rear sprocket assembly 6 has a plurality of gear positions.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle (not shown) with facing a handlebar (not shown). Accordingly, these terms, as utilized to describe the bicycle transmission apparatus 10, should be interpreted relative to the bicycle equipped with the bicycle transmission apparatus 10 as used in an upright riding position on a horizontal surface.

As seen in FIG. 1, the first transmission device 14 includes a chain guide 18, a guide actuator 20, a position sensor 22, and a motor driver 24. The chain guide 18 is configured to shift the bicycle chain 2 between gear positions of the front sprocket assembly 4. The guide actuator 20 is configured to move the chain guide 18 to shift the bicycle chain 2 relative to the front sprocket assembly 4. Possible examples of the guide actuator 20 include a direct current motor and a stepper motor.

The position sensor 22 is configured to sense a current position of the guide actuator 20 for determining a current gear position of the first transmission device 14. Possible examples of the position sensor 22 include a contact rotational position sensor such as a potentiometer, and a non-contact rotational position sensor such as an optical sensor (e.g., a rotary encoder) and a magnetic sensor (e.g., a hall sensor). The motor driver 24 is configured to control the guide actuator 20 based on the current position of the guide actuator 20 and control signals from the controller 12.

As seen in FIG. 1, the second transmission device 16 includes a chain guide 26, a guide actuator 28, a position sensor 30, and a motor driver 32. The chain guide 26 is configured to shift the bicycle chain 2 between gear positions of the rear sprocket assembly 6. The guide actuator 28 is configured to move the chain guide 26 to shift the bicycle chain 2 relative to the rear sprocket assembly 6. Possible examples of the guide actuator 28 include a direct current motor and a stepper motor.

The position sensor 30 is configured to sense a current position of the guide actuator 28 for determining the current gear position of the second transmission device 16. Possible examples of the position sensor 30 include a contact rotational position sensor such as a potentiometer, and a non-contact rotational position sensor such as an optical sensor (e.g., a rotary encoder) and a magnetic sensor (e.g., a hall sensor). The motor driver 32 is configured to control the guide actuator 28 based on the current position of the guide actuator 28 and control signals from the controller 12.

As seen in FIG. 1, the controller 12 is configured to control the at least one transmission device in accordance with a transmission route in response to a shift signal. In the illustrated embodiment, the controller 12 is configured to control the first transmission device 14 and the second transmission device 16 in accordance with the transmission route in response to the shift signal.

The controller 12 is constituted as a microcomputer and includes a processor 34 and a memory 36. The processor 34 includes a central processing unit (CPU). The memory 36 includes a read only memory (ROM) and a random access memory (RAM). For example, a program stored in the memory 36 is read into the processor 34, and thereby several functions of the controller 12 are performed.

While the controller 12 is electrically connected to the other parts, the controller 12 can be connected to at least one of the other parts using wireless communication technology if needed and/or desired. Furthermore, while the controller 12 is illustrated as a single unit in FIG. 1, the controller 12 can be part of another component or can be part of several components (e.g., multiple controllers located in different parts).

As seen in FIG. 1, the bicycle transmission apparatus 10 further comprises an operating device 38 configured to generate the shift signal. The operating device 38 includes a first upshift switch US1 and a first downshift switch DS1. The first upshift switch US1 is configured to generate a first upshift signal as the shift signal in response to an upshift input operation from a user. The first downshift switch DS1 is configured to generate a first downshift signal as the shift signal in response to a downshift input operation from the user.

The first upshift switch US1 includes a first upshift operating member (not shown) such as a lever or a button. The first upshift switch US1 is configured to receive the upshift input operation from the user via the first upshift operating member. Similarly, the first downshift switch DS1 includes a first downshift operating member (not shown) such as a lever or a button. The first downshift switch DS1 is configured to receive the downshift input operation from the user via the first downshift operating member.

As seen in FIG. 1, the operating device 38 includes a second upshift switch US2 and a second downshift switch DS2. The second upshift switch US2 is configured to generate a second upshift signal as the shift signal in response to an upshift input operation from the user. The second downshift switch DS2 is configured to generate a second downshift signal as the shift signal in response to a downshift input operation from the user.

The second upshift switch US2 includes a second upshift operating member (not shown) such as a lever or a button. The second upshift switch US2 is configured to receive the upshift input operation from the user via the second upshift operating member. Similarly, the second downshift switch DS2 includes a second downshift operating member (not shown) such as a lever or a button. The second downshift switch DS2 is configured to receive the downshift input operation from the user via the second downshift operating member.

In the illustrated embodiment, the operating device 38 includes the first upshift switch US1, the first downshift switch DS1, the second upshift switch US2, and the second downshift switch DS2. However, at least one of these switches can be omitted from the operating device 38. For example, the second upshift switch US2 and the second downshift switch DS2 can be omitted from the operating device 38 if needed and/or desired.

Furthermore, while the bicycle transmission apparatus 10 comprises the operating device 38 in the illustrated embodiment, the operating device 38 can be omitted from the bicycle transmission apparatus 10 if needed and/or desired. For example, the controller 12 can be configured to automatically control the transmission device such as the first transmission device 14 and the second transmission device 16 without the input signal such as the first upshift signal and the first downshift signal.

As seen in FIG. 1, the controller 12 is configured to adjust the transmission route based on bicycle information relating to a running condition of the bicycle. The bicycle transmission apparatus 10 further comprises a bicycle-information obtaining device 40 configured to obtain the bicycle information. In the illustrated embodiment, the bicycle information includes a cadence indicating a rotational speed of a crank 8 of the bicycle. The controller 12 is configured to adjust the transmission route based on the cadence. Namely, the bicycle-information obtaining device 40 includes a cadence sensor configured to sense the cadence. The bicycle-information obtaining device 40 is attached to a chain stay of a bicycle frame (not shown).

Figure 2:
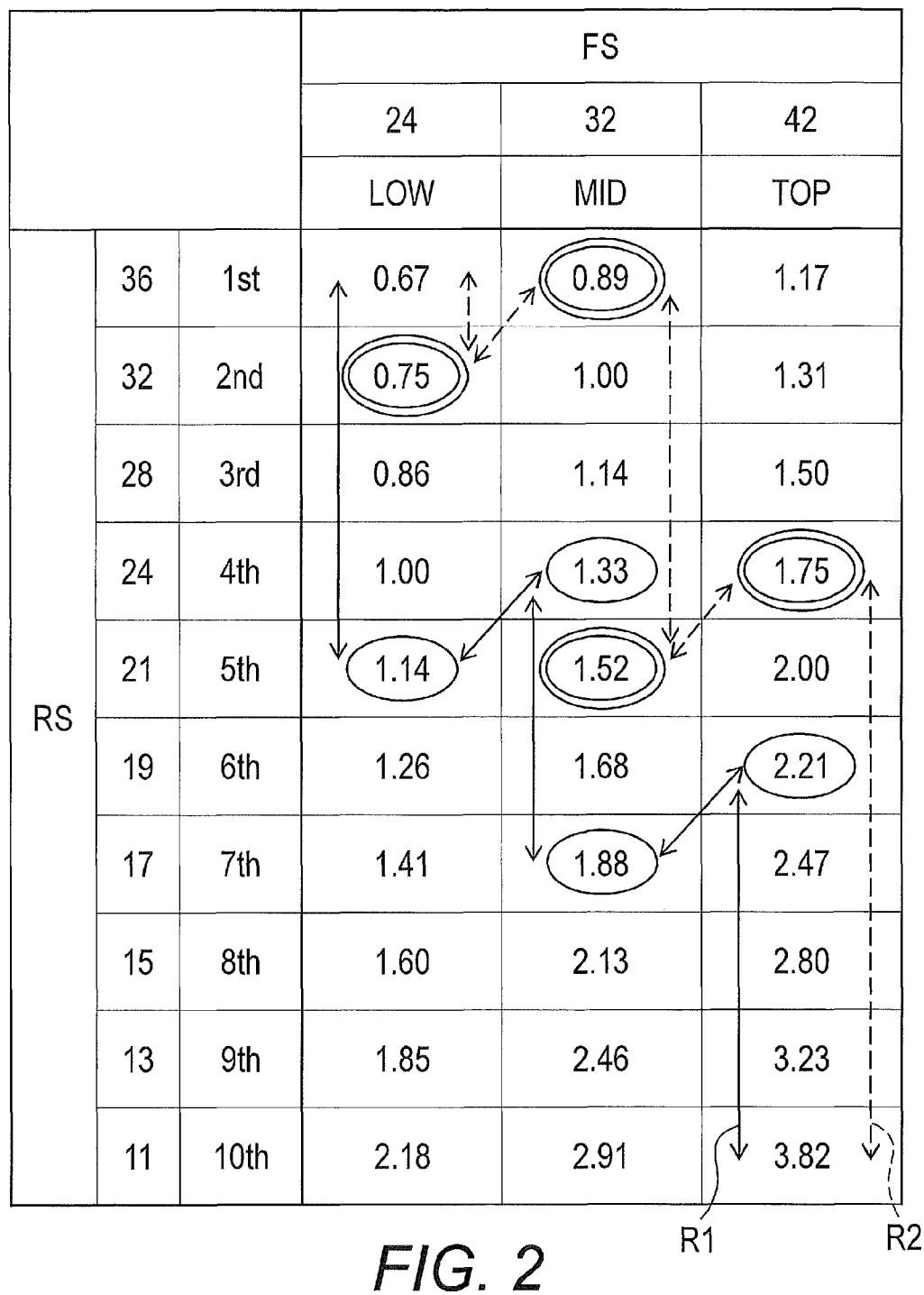
FIG. 2 shows a shift table of the bicycle transmission apparatus illustrated in FIG. 1.

As seen in FIG. 2, the transmission route includes a combination of a gear position of the first transmission device 14, a gear position of the second transmission device 16, and a transmission action. As seen in FIG. 1, the controller 12 is configured to store the transmission route in the memory 36.

FIG. 2 shows a shift table including gear ratios, a total number of teeth of each sprocket element in the front sprocket assembly 4 ("FS"), and a total number of teeth of each sprocket element in the rear sprocket assembly 6 ("RS"). The controller 12 is configured to store the shift table for the bicycle transmission apparatus 10. In the illustrated embodiment, the first transmission device 14 has low, middle and top gears as the gear position. The second transmission device 16 has first to tenth gears as the gear position.

As seen in FIG. 2, the controller 12 is configured to store a plurality of routes as the transmission route in the memory 36. More specifically, the controller 12 is configured to store a first route R1 and a second route R2 in the memory 36 (FIG. 1). The first route R1 is indicated with a solid line, and the second route R2 is indicated with a broken line. The first route R1 includes predetermined shift points which are each circled with a single circle. The second route R2 includes predetermined shift points which are each circled with a double circle. In the illustrated embodiment, the controller 12 is configured to control the first transmission device 14 and the second transmission device 16 at the gear position corresponding to the predetermined shift point in response to a single shift signal.

In the illustrated embodiment, the first route R1 is used for both upshifting and downshifting. The second route R2 is used for both upshifting and downshifting. The controller 12 can be configured to store an upshift route for upshifting and a downshift route, which is different from the upshift route, for downshifting if needed and/or desired.

In the present application, the term "upshift" refers to changing into a higher gear in the bicycle transmission apparatus 10. The term "downshift" refers to changing into a lower gear in the bicycle transmission apparatus 10. For example, upshifting occurs when the bicycle chain 2 (FIG. 1) is shifted by the first transmission device 14 from a smaller sprocket to a neighboring larger sprocket in the front sprocket assembly 4. The larger sprocket has a total number of teeth larger than a total number of teeth of the neighboring smaller sprocket. Downshifting occurs when the bicycle chain 2 is shifted by the second transmission device 16 from a small sprocket to a neighboring larger sprocket in the rear sprocket assembly 6. The smaller sprocket has a total number of teeth smaller than a total number of teeth of the neighboring larger sprocket.

As seen in FIG. 2, in the first route R1, first to fifth gears of the second transmission device 16 are used for low gear of the first transmission device 14. Fourth to seventh gears of the second transmission device 16 are used for middle gear of the first transmission device 14. Sixth to tenth gears of the second transmission device 16 are used for top gear of the first transmission device 14. Namely, the bicycle transmission apparatus 10 has fourteen gear positions on the first route R1.

As seen in FIG. 2, in the second route R2, first and second gears of the second transmission device 16 are used for low gear of the first transmission device 14. First to fifth gears of the second transmission device 16 are used for middle gear of the first transmission device 14. Fourth to tenth gears of the second transmission device 16 are used for top gear of the first transmission device 14. Namely, the bicycle transmission apparatus 10 has fourteen gear positions on the second route R2.

A total number of gear positions in the second route R2 is equal to a total number of gear positions in the first route R1. However, the second route R2 includes higher gear ratios at part of gear positions than gear ratios corresponding to the part of gear positions in the first route R1. Namely, the second route R2 partially provides higher gear ratios in comparison with the first route R1.

As seen in FIG. 2, the transmission route includes the combination of the gear position of the first transmission device 14, the gear position of the second transmission device 16, and the transmission action. The transmission action is to be performed at the gear position of the first transmission device 14 and the gear position of the second transmission device 16 in at least one of the first transmission device 14 and the second transmission device 16 in response to the shift signal.

The transmission action includes a first transmission action and a second transmission action. The first transmission action is to be performed at the gear position of the first transmission device 14 and the gear position of the second transmission device 16 in the first transmission device 14 in response to the shift signal. The second transmission action is to be performed at the gear position of the first transmission device 14 and the gear position of the second transmission device 16 in the second transmission device 16 in response to the shift signal.

FIG. 3 shows one example of the transmission action of the bicycle transmission apparatus 10 in the first route R1. FIG. 4 shows one example of the transmission action of the bicycle transmission apparatus 10 in the second route R2. In the illustrated embodiment, the first transmission action ("ACTION/FD") includes an upshift action ("UP"), a downshift action ("DOWN"), and a waiting action ("-") in the first transmission device 14. The waiting action of the first transmission device 14 is an action in which the first transmission device 14 keeps a current gear position without upshifting and downshifting.

The second transmission action ("ACTION/RD") includes an upshift action ("UP"), a downshift action ("DOWN"), and a waiting action ("-") in the second transmission device 16. The waiting action of the second transmission device 16 is an action in which the second transmission device 16 keeps a current gear position without upshifting and downshifting.

The controller 12 is configured to generate control signals for controlling the first transmission device 14 and the second transmission device 16 based on the information illustrated in FIGS. 2 to 4. The motor driver 24 is configured to control the guide actuator 20 based on the current position of the guide actuator 20 and the control signals from the controller 12. The motor driver 32 is configured to control the guide actuator 28 based on the current position of the guide actuator 28 and the control signals from the controller 12.

The controller 12 has a first shifting mode and a second shifting mode. In the first shifting mode, the controller 12 is configured to control the at least one transmission device in accordance with the transmission route in response to the shift signal with adjusting the transmission route. In the second shifting mode, the controller 12 is configured to control the at least one transmission device in accordance with the transmission route in response to the shift signal without adjusting the transmission rule.

The controller 12 has a third shifting mode in addition to the first shifting mode and the second shifting mode. In the third shifting mode, the controller 12 is configured to control the first transmission device 14 based on the first upshift signal and the first downshift signal without using the transmission route. In the third shifting mode, the controller 12 is configured to control the second transmission device 16 based on the second upshift signal and the second downshift signal without using the transmission route.

As seen in FIG. 1, the bicycle transmission apparatus 10 further comprises a mode selector 42 configured to allow the user to select a shifting mode among the first shifting mode and the second shifting mode. In the illustrated embodiment, the mode selector 42 is configured to allow the user to select the shifting mode among the first shifting mode, the second shifting mode, and the third shifting mode. The controller 12 is configured to set the shifting mode selected via the mode selector 42.

While the controller 12 has the first to third shifting modes, at least one of the second shifting mode and the third shifting mode can be omitted from the controller 12 if needed and/or desired. In a case where the second and third shifting modes are omitted from the controller 12, the mode selector 42 can be omitted from the bicycle transmission apparatus 10.

First Shifting Mode

In the first shifting mode, the controller 12 is configured to control the first transmission device 14 and the second transmission device 16 in accordance with the transmission route in response to the shift signal with adjusting the transmission route.

In the first shifting mode, the controller 12 is configured to control the at least one transmission device in accordance with the transmission route in response to the first upshift signal. The controller 12 is configured to control the at least one transmission device in accordance with the transmission route in response to the first downshift signal.

In the illustrated embodiment, the controller 12 is configured to control the first transmission device 14 and the second transmission device 16 in accordance with the transmission route in response to the first upshift signal. The controller 12 is configured to control the first transmission device 14 and the second transmission device 16 in accordance with the transmission route in response to the first downshift signal. The second upshift switch US2 and the second downshift switch DS2 are not used in the first shifting mode.

In the first shifting mode, the controller 12 is configured to adjust the transmission route (FIG. 2) based on the cadence obtained by the bicycle-information obtaining device 40. The controller 12 is configured to determine whether the cadence obtained by the bicycle-information obtaining device 40 is lower than a reference cadence. The controller 12 is configured to store the reference cadence in the memory 36. The reference cadence can be set by the user using an input device if needed and/or desired.

The controller 12 is configured to select one of the first route R1 and the second route R2 based on the cadence and the reference cadence. The lower cadence is likely to indicate that the rider pedals under higher load. The controller 12 selects the first route R1 in a case where the cadence is lower than the reference cadence. The higher cadence is likely to indicate that the rider pedals under lower load. The controller 12 selects the second route R2 having higher gear ratios in a case where the cadence is equal to or higher than the reference cadence.

As seen in FIGS. 2 and 3, in a case where the first transmission device 14 is in low gear and the second transmission device 16 is in fourth gear on the first route R1, the controller 12 controls the first transmission device 14 to keep in low gear and the second transmission device 16 to upshift in response to the first upshift signal from the operating device 38. In a case where the first transmission device 14 is in low gear and the second transmission device 16 is in fourth gear on the first route R1, the controller 12 controls the first transmission device 14 to keep in low gear and the second transmission device 16 to downshift in response to the first downshift signal from the operating device 38.

In a case where the first transmission device 14 is in low gear and the second transmission device 16 is in fifth gear on the first route R1, the controller 12 controls the first transmission device 14 to upshift and the second transmission device 16 to downshift in response to the first upshift signal from the operating device 38. In a case where the first transmission device 14 is in middle gear and the second transmission device 16 is in fourth gear on the first route R1, the controller 12 controls the first transmission device 14 to downshift and the second transmission device 16 to upshift in response to the first downshift signal from the operating device 38.

As seen in FIGS. 2 and 4, in a case where the first transmission device 14 is in middle gear and the second transmission device 16 is in fourth gear on the second route R2, the controller 12 controls the first transmission device 14 to keep in middle gear and the second transmission device 16 to upshift in response to the first upshift signal from the operating device 38. In a case where the first transmission device 14 is in middle gear and the second transmission device 16 is in fourth gear on the second route R2, the controller 12 controls the first transmission device 14 to keep in middle gear and the second transmission device 16 to downshift in response to the first downshift signal from the operating device 38.

In a case where the first transmission device 14 is in middle gear and the second transmission device 16 is in fifth gear on the second route R2, the controller 12 controls the first transmission device 14 to upshift and the second transmission device 16 to downshift in response to the first upshift signal from the operating device 38. In a case where the first transmission device 14 is in top gear and the second transmission device 16 is in fourth gear on the second route R2, the controller 12 controls the first transmission device 14 to downshift and the second transmission device 16 to upshift in response to the first downshift signal from the operating device 38.

Second Shifting Mode

In the second shifting mode, the controller 12 is configured to control the first transmission device 14 and the second transmission device 16 in accordance with the transmission route in response to the shift signal without adjusting the transmission route. In the second shifting mode, for example, the controller 12 is configured to control the first transmission device 14 and the second transmission device 16 in accordance with only the first route R1 in response to the shift signal. In the second shifting mode, the controller 12 is configured to select the first route R1 as the transmission route regardless of the bicycle information (e.g., the cadence). The controller 12 can be configured to control the first transmission device 14 and the second transmission device 16 in accordance with only the second route R2 instead of the first route R1.

The actions of the bicycle transmission apparatus 10 in the second shifting mode are the same as those of the bicycle transmission apparatus 10 on the first route R1 in the first shifting mode. Thus, they will not be described in detail here for the sake of brevity.

Third Shifting Mode

In the third shifting mode, for example, the controller 12 is configured to control the first transmission device 14 to upshift in response to the first upshift signal from the first upshift switch US1 of the operating device 38. The controller 12 is configured to control the first transmission device 14 to downshift in response to the first downshift signal from the first downshift switch DS1 of the operating device 38. The controller 12 is configured to control the second transmission device 16 to upshift in response to the second upshift signal from the second upshift switch US2 of the operating device 38. The controller 12 is configured to control the second transmission device 16 to downshift in response to the second downshift signal from the second downshift switch DS2 of the operating device 38. Namely, it is possible to use thirty gear positions in the first transmission device 14 and the second transmission device 16.

With the bicycle transmission apparatus 10, the controller 12 is configured to control at least one transmission device in accordance with the transmission route in response to the shift signal. The controller 12 is configured to adjust the transmission route based on the bicycle information relating to the running condition of the bicycle. Accordingly, it is possible to adjust a gear ratio of the bicycle transmission apparatus 10 in accordance with the running condition of the bicycle.

Second Embodiment

A bicycle transmission apparatus 210 in accordance with a second embodiment will be described below referring to FIG. 5. The bicycle transmission apparatus 210 has the same configuration as the bicycle transmission apparatus 10 except for the bicycle-information obtaining device 40. Thus, elements having substantially the same function as those in the first embodiment will be numbered the same here, and will not be described and/or illustrated again in detail here for the sake of brevity.

Figure 5:
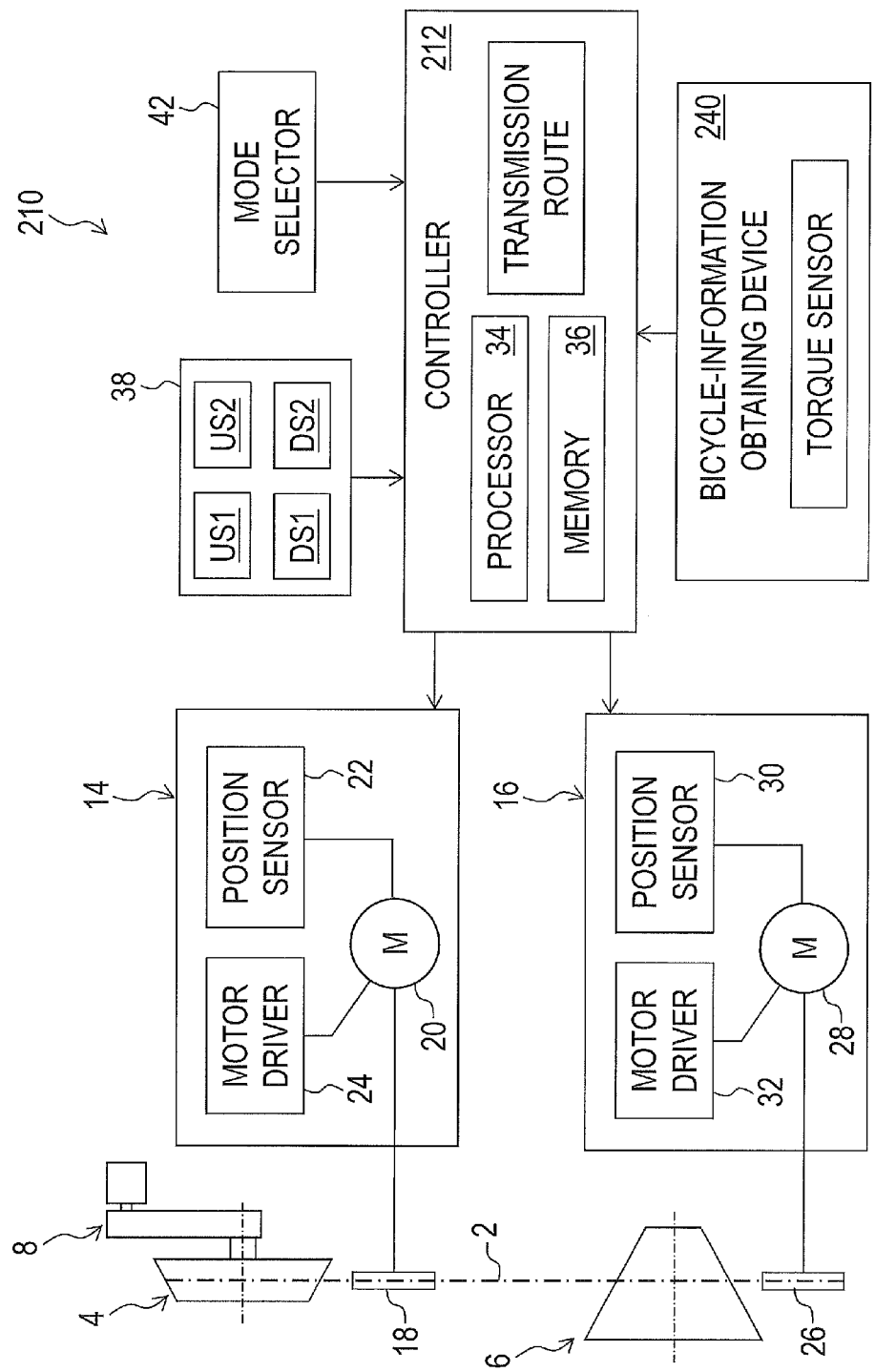
FIG. 5 is a block diagram of a bicycle transmission apparatus in accordance with a second embodiment.

As seen in FIG. 5, the bicycle transmission apparatus 210 comprises a controller 212 and a bicycle-information obtaining device 240. The controller 212 is configured to adjust the transmission route based on bicycle information relating to the running condition of the bicycle. The bicycle-information obtaining device 240 is configured to obtain the bicycle information. In the illustrated embodiment, the bicycle information includes a torque applied from a rider to the crank 8 of the bicycle. Namely, the bicycle-information obtaining device 240 includes a torque sensor configured to sense a pedaling torque applied to the crank 8. The bicycle-information obtaining device 240 is provided in the crank 8, for example.

The controller 212 is configured to adjust the transmission route based on the torque. The controller 212 has substantially the same configuration as that of the controller 12 in accordance with the first embodiment. However, the controller 212 uses the torque obtained by the bicycle-information obtaining device 240 instead of the cadence. More specifically, the controller 212 is configured to determine whether the torque obtained by the bicycle-information obtaining device 240 is higher than a reference torque. The controller 212 is configured to store the reference torque in the memory 36. The reference torque can be set by the user using an input device if needed and/or desired.

The controller 212 is configured to select one of the first route R1 and the second route R2 (FIG. 2) based on the torque and the reference torque. The larger torque is likely to indicate that the rider pedals under higher load. The controller 212 selects the first route R1 in a case where the torque is larger than the reference torque. The smaller torque is likely to indicate that the rider pedals under lower load. The controller 212 selects the second route R2 in a case where the torque is equal to or smaller than the reference torque.

Actions of the bicycle transmission apparatus 210 in the first to third shifting modes are the same as those of the bicycle transmission apparatus 10 in accordance with the first embodiment. Accordingly, they will not be described in detail here for the sake of brevity.

With the bicycle transmission apparatus 210, it is possible to obtain substantially the same advantageous effect as that of the bicycle transmission apparatus 10 in accordance with the first embodiment.

Third Embodiment

A bicycle transmission apparatus 310 in accordance with a third embodiment will be described below referring to FIG. 6. The bicycle transmission apparatus 310 has the same configuration as the bicycle transmission apparatus 10 except for the bicycle-information obtaining device 40. Thus, elements having substantially the same function as those in the above embodiments will be numbered the same here, and will not be described and/or illustrated again in detail here for the sake of brevity.

Figure 6:
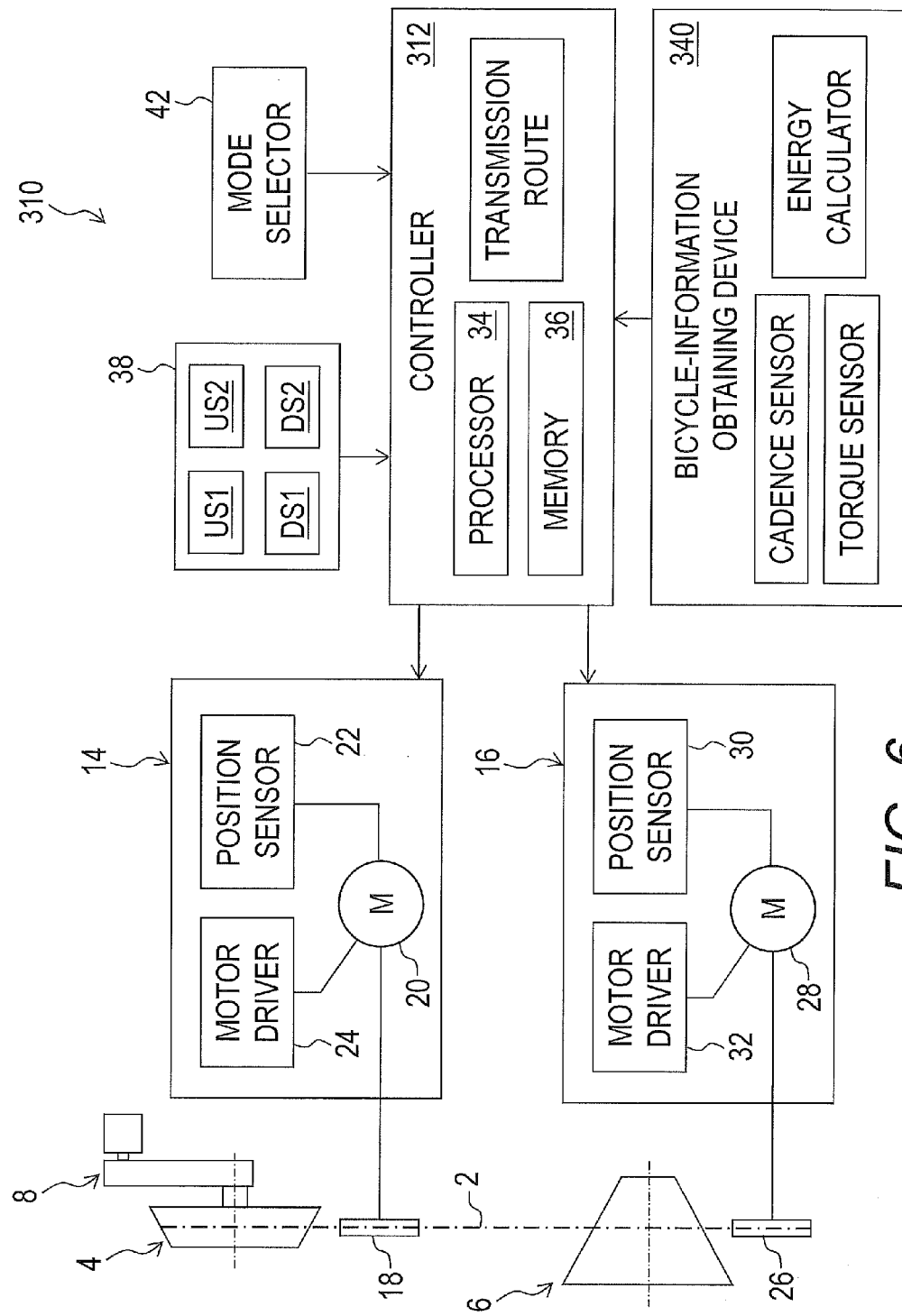
FIG. 6 is a block diagram of a bicycle transmission apparatus in accordance with a third embodiment.

As seen in FIG. 6, the bicycle transmission apparatus 310 comprises a controller 312 and a bicycle-information obtaining device 340. The controller 312 is configured to adjust the transmission route based on bicycle information relating to the running condition of the bicycle. The bicycle-information obtaining device 340 is configured to obtain the bicycle information. In the illustrated embodiment, the bicycle information includes an amount of energy applied from a rider to the crank 8 of the bicycle. Namely, the bicycle-information obtaining device 340 includes an energy calculator configured to calculate the amount of energy applied from the rider to the crank 8 of the bicycle. The bicycle-information obtaining device 340 includes the cadence sensor and the toque sensor. The cadence sensor is configured to sense the cadence. The torque sensor is configured to sense the torque applied to the crank 8. The energy calculator is configured to calculate the amount of energy by multiplying the cadence by the torque. The energy calculator can be performed by the controller 312.

The controller 312 is configured to adjust the transmission route based on the amount of energy. More specifically, the controller 312 is configured to determine whether the amount of energy obtained by the bicycle-information obtaining device 340 is higher than a reference amount of energy. The controller 312 is configured to store the reference amount of energy in the memory 36. The reference amount of energy can be set by the user using an input device if needed and/or desired.

The controller 312 is configured to select one of the first route R1 and the second route R2 (FIG. 2) based on the amount of energy and the reference amount of energy. The lower amount of energy is likely to indicate that the rider has lower performance. The controller 312 selects the first route R1 in a case where the amount of energy is lower than the reference amount of energy. The higher amount of energy is likely to indicate that the rider has higher performance. The controller 312 selects the second route R2 in a case where the amount of energy is equal to or higher than the reference amount of energy.

Actions of the bicycle transmission apparatus 310 in the first to third shifting modes are the same as those of the bicycle transmission apparatus 10 in accordance with the first embodiment. Accordingly, they will not be described in detail here for the sake of brevity.

With the bicycle transmission apparatus 310, it is possible to obtain substantially the same advantageous effect as that of the bicycle transmission apparatus 10 in accordance with the first embodiment.

Fourth Embodiment

A bicycle transmission apparatus 410 in accordance with a fourth embodiment will be described below referring to FIG. 7. The bicycle transmission apparatus 410 has the same configuration as the bicycle transmission apparatus 10 except for the bicycle-information obtaining device 40. Thus, elements having substantially the same function as those in the above embodiments will be numbered the same here, and will not be described and/or illustrated again in detail here for the sake of brevity.

Figure 7:
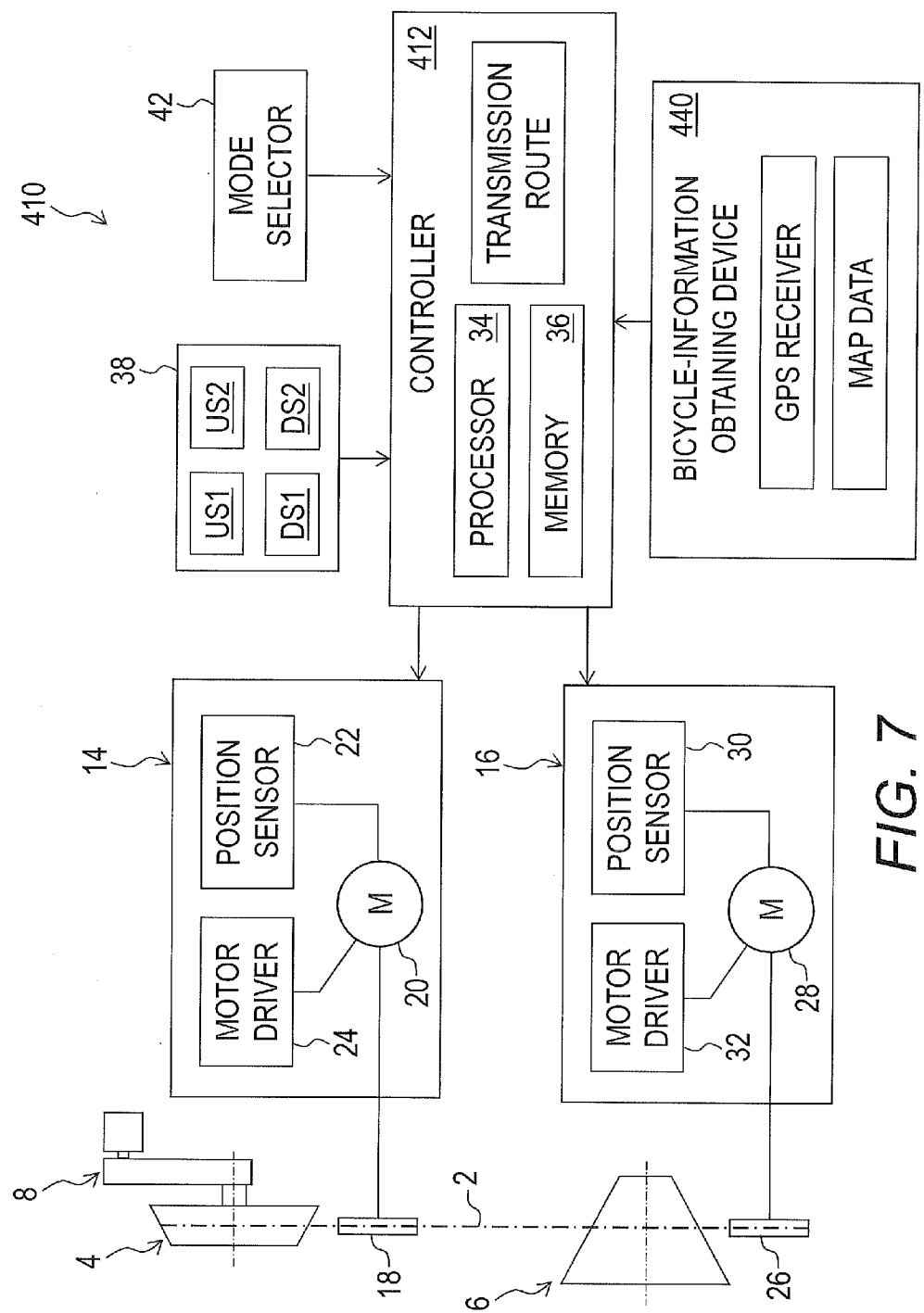
FIG. 7 is a block diagram of a bicycle transmission apparatus in accordance with a fourth embodiment.

As seen in FIG. 7, the bicycle transmission apparatus 410 comprises a controller 412 and a bicycle-information obtaining device 440. The controller 412 is configured to adjust the transmission route based on bicycle information relating to the running condition of the bicycle. The bicycle-information obtaining device 440 is configured to obtain the bicycle information. In the illustrated embodiment, the bicycle information includes a geographical location of the bicycle. The bicycle-information obtaining device 440 includes a global positioning system (GPS) receiver configured to receive signals from a GPS to obtain a current geographical location of the bicycle. The bicycle-information obtaining device 440 is provided in a cycle computer, for example. The bicycle-information obtaining device 440 is configured to store map data. The bicycle-information obtaining device 440 can be provided in the controller 412. The controller 412 is configured to store the map data in the memory 36.

The controller 412 is configured to adjust the transmission route based on the geographical location. More specifically, the controller 412 is configured to determine a geographical feature of the current geographical location based on the current geographical location and the map data. The controller 412 is configured to determine whether the geographical feature satisfies a reference condition. The controller 412 is configured to store the reference condition in the memory 36. The reference condition can be set by the user using an input device if needed and/or desired. Possible examples of the reference condition include a slope of a road where the bicycle rides.

The controller 412 is configured to select one of the first route R1 and the second route R2 (FIG. 2) based on the geographical feature and the reference condition. For example, the controller 412 selects the first route R1 in a case where the geographical feature does not satisfy the reference condition (e.g., in a case where the slope of the current geographical location is larger than a reference slope). The controller 412 selects the second route R2 in a case where the geographical feature satisfies the reference condition (e.g., in a case where the slope of the current geographical location is equal to or lower than the reference slope).

With the bicycle transmission apparatus 410, it is possible to obtain substantially the same advantageous effect as that of the bicycle transmission apparatus 10 in accordance with the first embodiment.

While the at least one transmission device includes two transmission devices in the above embodiments, the at least one transmission device can include a single transmission device or more than three transmission devices if needed and/or desired. Possible examples of the at least one transmission device include a derailleur, an internal-gear hub, a gearbox having a plurality of gear positions, and a continuously variable transmission. Possible examples of the at least one transmission device further include a combination of a rear internal-gear hub and a rear derailleur, a combination of a front internal-gear hub and a front derailleur, and a combination of a front derailleur and an electric-assisted unit having an internal-gear.

In a case where the at least one transmission device can include a single transmission device having a plurality of gear positions, for example, the controller is configured to control the single transmission device in accordance with a transmission route in response to a shift signal. In such an embodiment, the controller can be configured to adjust the transmission route so that a difference between adjacent gear ratios varies in accordance with the bicycle information. Furthermore, the controller can be configured to adjust the transmission route so that gear positions are at least partially restricted in accordance with the bicycle information. The controller can be configured to adjust the transmission route so that a shift route is switched among a plurality of routes in accordance with the bicycle information.

It will be apparent to those skilled in the bicycle field from the present disclosure that the above embodiments can be at least partially combined with each other.

In the present application, the term "comprising" and its derivatives, as used herein, are intended to be open ended terms that specify the presence of the stated features, elements, components, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle transmission apparatus comprising:
a controller configured to control at least one transmission device in accordance with a transmission route in response to a shift signal, the controller being configured to select one of a plurality of predetermined routes as the transmission route based on bicycle information relating to a running condition of a bicycle.

2. The bicycle transmission apparatus according to claim 1, further comprising:
a bicycle-information obtaining device configured to obtain the bicycle information.

3. The bicycle transmission apparatus according to claim 1, wherein
the bicycle information includes a cadence indicating a rotational speed of a crank of the bicycle, and
the controller is configured to select one of the plurality of predetermined routes as the transmission route based on the cadence.

4. The bicycle transmission apparatus according to claim 3, wherein
the controller selects one of the plurality of predetermined routes as the transmission route in a case where the cadence is lower than a reference cadence, and
the controller selects another of the plurality of predetermined routes as the transmission route in a case where the cadence is higher than the reference cadence.

5. The bicycle transmission apparatus according to claim 1, wherein
the bicycle information includes a torque applied from a rider to a crank of the bicycle, and
the controller is configured to select one of the plurality of predetermined routes as the transmission route based on the torque.

6. The bicycle transmission apparatus according to claim 5, wherein
the controller selects one of the plurality of predetermined routes as the transmission route in a case where the torque is larger than a reference torque, and the controller selects another of the plurality of predetermined routes as the transmission route in a case where the torque is smaller than the reference torque.

7. The bicycle transmission apparatus according to claim 1, wherein
the bicycle information includes an amount of energy applied from a rider to a crank of the bicycle, and
the controller is configured to select one of the plurality of predetermined routes as the transmission route based on the amount of energy.

8. The bicycle transmission apparatus according to claim 7, wherein
the controller selects one of the plurality of predetermined routes as the transmission route in a case where the amount of energy is lower than a reference amount of energy, and
the controller selects another of the plurality of predetermined routes as the transmission route in a case where the amount of energy is higher than the reference amount of energy.

9. The bicycle transmission apparatus according to claim 1, wherein
the at least one transmission device includes a first transmission device and a second transmission device.

10. The bicycle transmission apparatus according to claim 9, wherein
the first transmission device comprises a front derailleur, and
the second transmission device comprises a rear derailleur.

11. The bicycle transmission apparatus according to claim 9, wherein
each of the plurality of predetermined routes provided as the transmission route includes a combination of
a gear position of the first transmission device,
a gear position of the second transmission device, and
a transmission action to be performed at the gear position of the first transmission device and the gear position of the second transmission device in at least one of the first transmission device and the second transmission device in response to the shift signal.

12. The bicycle transmission apparatus according to claim 10, wherein the transmission action includes
a first transmission action to be performed at the gear position of the first transmission device and the gear position of the second transmission device in the first transmission device in response to the shift signal, and
a second transmission action to be performed at the gear position of the first transmission device and the gear position of the second transmission device in the second transmission device in response to the shift signal.

13. The bicycle transmission apparatus according to claim 9, wherein
the controller is configured to control the first transmission device and the second transmission device in accordance with the transmission route in response to a single shift signal provided as the shift signal.

14. The bicycle transmission apparatus according to claim 1, further comprising:
an operating device configured to generate the shift signal, wherein
the operating device includes
a first upshift switch configured to generate a first upshift signal as the shift signal in response to an upshift input operation from a user, and
a first downshift switch configured to generate a first downshift signal as the shift signal in response to a downshift input operation from the user.

15. The bicycle transmission apparatus according to claim 14, wherein
the controller is configured to control the at least one transmission device in accordance with the transmission route in response to the first upshift signal, and
the controller is configured to control the at least one transmission device in accordance with the transmission route in response to the first downshift signal.

16. The bicycle transmission apparatus according to claim 1, wherein
the controller includes a memory configured to store the plurality of predetermined routes.

17. A bicycle transmission apparatus comprising:
a controller configured to control at least one transmission device in accordance with a transmission route in response to a shift signal, the controller being configured to select one of a plurality of predetermined routes as the transmission route based on bicycle information relating to a running condition of a bicycle,
the bicycle information including a geographical location of the bicycle, and
the controller being configured to select one of the plurality of predetermined routes as the transmission route based on the geographical location.

18. The bicycle transmission apparatus according to claim 17, wherein
the controller selects one of the plurality of predetermined routes as the transmission route in a case where a geographical feature of the geographical location does not satisfy a reference condition, and
the controller selects another of the plurality of predetermined routes as the transmission route in a case where the geographical feature of the geographical location satisfies the reference condition.

19. The bicycle transmission apparatus according to claim 17, further comprising:
a bicycle-information obtaining device configured to obtain the bicycle information, wherein
the bicycle-information obtaining device includes a global positioning system receiver configured to receive signals from a global positioning system to obtain the geographical location of the bicycle.

20. A bicycle transmission apparatus comprising:
a controller configured to control at least one transmission device in accordance with a transmission route in response to a shift signal, the controller being configured to adjust the transmission route based on bicycle information relating to a running condition of a bicycle,
the controller having a first shifting mode and a second shifting mode,
in the first shifting mode, the controller being configured to control the at least one transmission device in accordance with the transmission route in response to the shift signal with adjusting the transmission route, and
in the second shifting mode, the controller being configured to control the at least one transmission device in accordance with the transmission route in response to the shift signal without adjusting the transmission route.

21. The bicycle transmission apparatus according to claim 20, further comprising:

a mode selector configured to allow a user to select a shifting mode among the first shifting mode and the second shifting mode, wherein the controller is configured to set the shifting mode selected via the mode selector.

22. The bicycle transmission apparatus according to claim 21, further comprising:

an operating device configured to generate the shift signal, wherein the operating device includes a first upshift switch configured to generate a first upshift signal as the shift signal in response to an upshift input operation from a user, and a first downshift switch configured to generate a first downshift signal as the shift signal in response to a downshift input operation from the user.

23. The bicycle transmission apparatus according to claim 22, wherein the controller has a third shifting mode in addition to the first shifting mode and the second shifting mode, in the third shifting mode, the controller is configured to control the first transmission device based on the first upshift signal and the first downshift signal without using the transmission route.

24. The bicycle transmission apparatus according to claim 23, wherein the operating device includes a second upshift switch configured to generate a second upshift signal as the shift signal in response to an upshift input operation from the user, and a second downshift switch configured to generate a second downshift signal as the shift signal in response to a downshift input operation from the user.

25. The bicycle transmission apparatus according to claim 24, wherein the at least one transmission device includes a first transmission device and a second transmission device, and in the third shifting mode, the controller is configured to control the first transmission device based on the first upshift signal and the first downshift signal without using the transmission route and to control the second transmission device based on the second upshift signal and the second downshift signal without using the transmission route.

* * * * *